United States Patent Office 3,303,173
Patented Feb. 7, 1967

3,303,173
DENTAL MATERIAL
Rolf Wandeler, Oestgeest, Netherlands, and Heinrich Hopff, Zurich, and André Schröder, Bern-Gumlingen, Switzerland, assignors to W. R. Grace & Co., Cambridge, Mass., a corporation of Connecticut
No Drawing. Filed Aug. 9, 1963, Ser. No. 301,170
Claims priority, application Germany, Aug. 14, 1962, G 35,714
8 Claims. (Cl. 260—79.7)

The present invention relates to a composition for use as a dental material and to the process of preparing such composition. In one particular aspect, it relates to a composition comprised of cured di-(4-epoxyethyl-phenyl) sulfide.

In the past, various plastics and synthetic resins have been used as dental materials for filling tooth cavities and preparing bridges. The inherent disadvantages of these materials have been poor adherence, insufficient hardness, volume shrinkage, too long hardening times, changes on aging, and physiological incompatibility.

It is a principal object of the present invention to overcome the aforementioned disadvantages involved in the use of plastics and synthetic resins.

Briefly stated, the composition of the instant invention is comprised of cured di-(4-epoxyethyl-phenyl) sulfide. The process for preparing this composition comprises melting di-(4-epoxyethyl-phenyl sulfide) with an epoxy resin curing agent in a molar ratio of 2:1 to 1:2 and allowing the resulting product to harden.

Di-(4-epoxyethyl-phenyl) sulfide, which may also be denoted as 4,4'-di-epoxyethyl-phenyl sulfide, is most simply prepared by reaction of phenyl sulfide with chloracetyl chloride according to Friedel-Crafts, reduction of the di-chloroketone obtained according to Meerwein-Ponndorf and dehydro-halogenation of the dichloroketone formed with alkali. The di(4-epoxyethyl-phenyl) sulfide shows, as compared to other epoxides, a strongly increased reactivity which is led back on the one hand to the epoxy groups directly adhering to the aromatic ring, on the other hand to the sulfur in para position which essentially increases the electron-repelling effect of the aromatic nucleus. This reactivity becomes particularly obvious in reaction with carboxylic acid anhydrides, but also with amines and other basic as well as acidic compounds.

The curing agents may be acidic, basic or neutral in character. They are of the type ordinarily used for curing epoxy resins such as carboxylic acid anhydrides and polyamines. Preferably, these agents are low-melting anhydrides of polybasic acids such as glutaric acid anhydride, succinic acid anyhdride, thiosuccinic acid anhydride and eutectic mixtures of carboxylic acid anhydrides. Examples of basic curing agents include diethyl- and triethylamine, diethylenetriamine, triethylenetetramine and benzylamine. Representative of neutral hardeners are salts of amines such as ammonium chloride and diethylamine hydrochloride.

The curing period, i.e. hardening period, of the di-(4-epoxyethylphenyl) sulfide depends on the particular curing agent used, the concentration of the curing agent and the curing temperature.

The cured di-(4-epoxyethyl-phenyl sulfide) can be used as a dental material for filling cavities, as dental prothesis, bridge material and for the preparation of dentures. It adheres effectively to the dentine, and it is stable on aging and physiologically inert. This material can be mixed in varying amounts with a number of inert filling materials such as porcelain powder, quartz powder, metal oxides and suitable dyestuffs without affecting the physical characteristics of the final product. The invention is further illustrated by the following examples:

Example 1

4,4'-di-epoxyethyl-phenyl sulfide was prepared by the following method. 9.82 g. (28.6 millimoles) of pure, crystalline 4,4'-di($\alpha$-hydroxy-$\beta$-chlorethyl-phenyl) sulfide having a melting point of 108–109° C. were dissolved in a 250 ml. round-bottomed flask at room temperature in 60 ml. of ethanol (99.7%). To the resulting water-clear solution, 23.83 ml. of 2.16 N alcoholic, freshly prepared and titrated potassium hydroxide solution (90%) were added dropwise over a period of 20 minutes with vigorous swinging of the flask. A fine white precipitate of potassium chloride was formed which became more and more dense. The flask was then vigorously shaken for 5 minutes. The resulting mixture showed a neutral reaction (universal indicator paper). Within a period of 5 minutes, an additional 10.6 ml. of the potassium hydroxide solution (30 percent excess) were added. After further shaking for about quarter of an hour, the mixture was extracted with a solution comprised of 400 ml. ether and 20 ml. water. The resulting ethereal solution was washed four times with 30 ml. of water each (the wash water was neutral after three washings). The ethereal solution was then dried over anhydrous sodium sulfate, evaporated under vacuum, and petroleum ether was added to the boiling solution (60–90° C.). The solvent was distilled off until the distillate had reached a boiling point of 50° C. Upon cooling of the solution, fine white flakes precipitated (6.47 g.=87.8%). These flakes melted at 71–72.5° C. Upon recrystallizing the precipitate twice from benzene/petroleum ether and ether/petroleum ether, avoiding any superheating, the melting point of the product increased to 72.5–73.5° C. and thereafter remained constant.

When titrating the combined wash waters back, 17 ml. 1 N hydrochloric acid were consumed (quantitative caustic consumption). About 30–40 mg. of the product were dissolved in 2 ml. of pyridine and boiled for 2 minutes. This resulted in a yellow-green color which deepened into a dirty dark-red-brown color. By a decomposition according to Lassaigne, no chlorine could be proved; the same applies to the Beilstein test.

The analytical sample was dried for 62 hours at 25° C./0.01 torr. and had a composition as follows:

$C_{16}H_{14}O_2S$ Calculated: C, 71.08%; H, 5.22%; S, 11.86%. Found: C, 71.25%; H, 5.40%; S, 12.01%.

Example 2

In this example crude dichlorohydrine was converted directly into the diepoxide. An ethereal solution containing crude chlorohydrine which was prepared from 33.925 g. 4,4'-dichloracetylphenyl sulfide according to Meerwein-Ponndorf-Verley was dehydrohalogenated at room temperature with 81.9 ml. of freshly prepared and titrated 3.175 N alcoholic potassium hydroxide in a manner similar to that set forth in Example I. After standing for 45 minutes, the product was treated in the manner described in Example I. The back-titration of the wash waters showed that 9.74 percent of caustic had not been consumed. The product melted at 71–72° C. and showed no depression of the mixed freezing point when compared to a diepoxide prepared from crystalline dichlorohydrine.

For determining the total yield, the mother liquor was freed from the solvent in a film evaporator and then dried first for 2 hours at 30–40° C. The resulting white powder was then dried along with the pure product obtained above for 4 hours under high vacuum of 0.3–0.4 torr. at room temperature to constant weight. The yield calculated therefrom amounted over two stages to 88.93 percent.

Example 3

The product made according to Example 1 was melted together with an equimolar amount of phthalic acid anhydride. Thereupon an immediate reaction took place. After a few seconds, a glass clear, very hard, completely transparent material was formed. After 1 minute, it was not possible to soften this material even at 140° C. This hard, transparent material, while in workable condition, was easily filled into tooth cavities. It adhered effectively to the dentine and showed practically no shrinkage of volume. It was extremely hard, physiologically inert and stable on aging.

*Example 4*

Di-(4-epoxyethyl-phenyl) sulfide was melted together with succinic acid anhydride in a molar ratio of 1:0.8. The melt was heated gently until it was just still workable. The melt having a temperature of about 40° C. was then filled into tooth cavities where it completely solidified within a few minutes. The product showed substantially the same characteristics as the material produced according to Example 3.

*Example 5*

A material comprised of a melt prepared from equimolar amounts of di-(4-epoxyethyl-phenyl) sulfide and hexamethylene diamine was stored in a refrigerator. Shortly before use the material was heated until it was just still workable and then it was employed for filling tooth cavities.

*Example 6*

A melt of equimolar amounts of di(4-epoxyethyl-phenyl) sulfide and thiosuccinic acid anhydride was thoroughly mixed with the same amount by weight of porcelain powder. The resulting product was used for filling tooth cavities. The product adhered extremely well to dentine and had the appearance of a natural tooth due to the porcelain powder. In addition, this product did not exhibit volume shrinkage.

We claim:
1. A process of preparing a dental material which comprises melting di-(4-epoxyethyl-phenyl) sulfide with an epoxy resin curing agent in a molar ratio of 2:1 to 1:2, said epoxy resin curing agent being a member of the group consisting of carboxylic acid anhydrides, polyamines and amine salts and allowing the mixture to harden.

2. The process according to claim 1 wherein the anhydride is phthalic acid anhydride.

3. The process according to claim 1 wherein the anhydride is succinic acid anhydride.

4. The process according to claim 1 wherein the anhydride is thiosuccinic anhydride.

5. The process according to claim 1 wherein the polyamine is a member of the group consisting of hexamethylene diamine diethylamine, triethylamine, diethylenetriamine, triethylentetraamine, and benzylamine.

6. The process according to claim 1 wherein the anhydride is glutaric acid anhydride.

7. The process according to claim 1 wherein the amine salt is a member of the group consisting of ammonium chloride and diethylamine hydrochloride.

8. A dental material comprised of cured di-(4-epoxyethyl-phenyl) sulfide produced by the process of claim 1.

No references cited.

JOSEPH L. SCHOFER, *Primary Examiner.*

D. K. DENENBERG, *Assistant Examiner.*